United States Patent
Du

(10) Patent No.: US 9,228,755 B2
(45) Date of Patent: Jan. 5, 2016

(54) VENT AND COVER PLATE ASSEMBLY FOR DUST-FREE WORKSHOP FLOOR

(71) Applicant: SHENZHEN CHINA STAR OPTOELECTRONICS TECHNOLOGY CO., LTD., Shenzhen, Guangdong (CN)

(72) Inventor: Qingkai Du, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/241,387

(22) PCT Filed: Jan. 22, 2014

(86) PCT No.: PCT/CN2014/071103
§ 371 (c)(1),
(2) Date: Feb. 26, 2014

(87) PCT Pub. No.: WO2015/081632
PCT Pub. Date: Jun. 11, 2015

(65) Prior Publication Data
US 2015/0226450 A1    Aug. 13, 2015

(30) Foreign Application Priority Data
Dec. 6, 2013 (CN) .......................... 2013 1 0655507

(51) Int. Cl.
| | |
|---|---|
| *B01D 53/22* | (2006.01) |
| *F24F 13/20* | (2006.01) |
| *F24F 13/06* | (2006.01) |
| *F24F 13/068* | (2006.01) |
| *F24F 3/16* | (2006.01) |
| *B01D 46/00* | (2006.01) |

(52) U.S. Cl.
CPC ............ *F24F 13/20* (2013.01); *B01D 46/0004* (2013.01); *F24F 3/161* (2013.01); *F24F 13/06* (2013.01); *F24F 13/068* (2013.01)

(58) Field of Classification Search
CPC ...... B01D 53/22; H05K 5/0213; F21S 48/332
USPC .............................. 55/385.4, 502; 95/45; 96/4
See application file for complete search history.

(56) References Cited

U.S. PATENT DOCUMENTS

| | | | | |
|---|---|---|---|---|
| 5,522,769 | A | * | 6/1996 | DeGuiseppi ................... 454/270 |
| 5,778,611 | A | * | 7/1998 | Michel ............................ 52/198 |
| 6,979,107 | B1 | * | 12/2005 | Benensohn .................... 362/374 |

(Continued)

FOREIGN PATENT DOCUMENTS

| | | |
|---|---|---|
| CN | 2346843 Y | 11/1999 |
| JP | H 5-106595 A | 4/1993 |

*Primary Examiner* — Robert A Hopkins
*Assistant Examiner* — Minh-Chau Pham
(74) *Attorney, Agent, or Firm* — Stein IP LLC

(57) ABSTRACT

The present disclosure discloses a vent and cover plate assembly for dust-free workshop floor, including a plurality of vents arranged on the dust-free workshop floor and cover plates that are each associated with a corresponding vent. The vents each include a hole and clamping slots arranged at an outer periphery of the hole, and the cover plates each include a cover body and clamping feet arranged at an outer periphery of the cover body. The cover body engages with the hole, and the clamping feet engage with respective clamping slots. The vent and cover plate assembly for dust-free workshop floor is firm and secure in engagement clamping and thus has small possibility of rolling over.

12 Claims, 2 Drawing Sheets

(56) References Cited

U.S. PATENT DOCUMENTS

| | | | |
|---|---|---|---|
| 8,814,993 B2* | 8/2014 | Yano | 96/4 |
| 8,828,125 B2* | 9/2014 | Furuuchi et al. | 96/4 |
| 2003/0126843 A1* | 7/2003 | Hsu | 55/385.4 |
| 2011/0111274 A1* | 5/2011 | Foushee | 429/89 |
| 2011/0312262 A1* | 12/2011 | Grandmaison | 454/276 |
| 2011/0312263 A1* | 12/2011 | Grandmaison | 454/283 |

* cited by examiner

VENT AND COVER PLATE ASSEMBLY FOR DUST-FREE WORKSHOP FLOOR

FIELD OF THE INVENTION

The present disclosure relates to a vent and cover plate assembly, in particular to a vent and cover plate assembly for dust-free workshop floor.

BACKGROUND OF THE INVENTION

To ensure the cleanness of production areas in a dust-free workshop for liquid crystal panels, a plurality of vents is typically arranged on a dust-free workshop floor. Purified air is blown downwardly through the vents by means of air purification equipment, and the air inside the workshop flows back to the air purification equipment from the two sides of the workshop, so as to be purified for subsequent circulation. To ensure the airflow direction inside the dust-free workshop, cover plates with different hole ratios are arranged above the vents in different areas, so that air can blow downwardly along a vertical direction in the production areas, and thus these production areas can be kept clean.

The vents in the prior art are circular holes, and the cover plates which are used with these vents are circular also. The vents and cover plates in the prior art have the following defects. On the one hand, the clamping engagement between the circular cover plate and the circular vent is infirm and insecure, and therefore the cover plate will be easy to be loosened after being trodden by vehicles or persons for long. On the other hand, when the circular cover plate engages with the circular vent, their contact surface will be likely to be unsmooth and uneven due to such factors as processing errors, and thus the circular cover plate can roll over easily when being trodden on. Since the vent is generally large in area with a diameter in the range from 20 to 50 cm, objects or persons will fall down from the cover plate if the poorly mounted cover plate rolls over.

SUMMARY OF THE INVENTION

The technical problem to be solved by the present disclosure is to provide a vent and cover plate assembly for dust-free workshop floor, which is firm and secure in clamping engagement and thus has small possibility of rolling over.

The technical solution adopted in the present disclosure is a vent and cover plate assembly for dust-free workshop floor, comprising a plurality of vents arranged on the dust-free workshop floor and cover plates that are each associated with a corresponding vent, wherein the vents each include a hole and clamping slots arranged at an outer periphery of the hole, and the cover plates each include a cover body and clamping feet arranged at an outer periphery of the cover body, and wherein the cover body engages with and the hole, and the clamping feet engage with respective clamping slots.

Compared with the prior art, the vent and cover plate assembly for dust-free workshop floor according to the present disclosure has the following advantages. With the arrangement of the clamping slots at the outer periphery of the hole of the vent and the arrangement of the clamping feet at the outer periphery of the cover body of the cover plate, clamping engagement between the clamping slots and the clamping feet can be provided when the cover body is placed on the vent, which enables a more firm and secure engagement between the cover plate and the vent. Meanwhile, the cover plate and the vent can engage with each other more stably thanks to the presence of the clamping slots and the clamping feet. Moreover, the engagement of the clamping slots and the clamping feet also increase a contact area between the vent and the cover plate, whereby rollover of the cover plate can be further avoided in case of treading, thus achieving better safety and reliability.

In one preferred embodiment, the clamping slots are uniformly distributed along a circumferential direction of the hole. This uniform distribution of the clamping slots along the hole results in more uniform stress, and therefore damage to the vent can be hardly caused even in case of abrasion.

In one embodiment, the clamping slots can be in the shapes of at least one selected from the group consisting of squares, semicircles, and arcs. Square, semicircular, and arc-shaped slots are relatively regular in shape, and thus can be processed easily. In one vent, the plurality of clamping slots preferably has the same structure or shape, e.g. designed as square slots. However, the clamping slots are not so limited that they may also be a combination of a plurality of structures or shapes. For example, among the six clamping slots of one vent, two symmetrical clamping slots can be arc-shaped slots, while the other four clamping slots can be square slots; alternatively, two of the other four clamping slots, which are opposite to each other, can be square slots, and the remaining two clamping slots can be semicircular slots.

In one improved embodiment, a retaining groove is arranged in the middle of the clamping slot, and a projection which can fit into the groove is arranged on the mounting surface of the clamping foot. The retaining groove and the projection can engage with each other during mounting, so as to restrict circumferential rotation of the cover plate. The retaining groove and the projection play a role for better limiting and retaining, thereby achieving more stable and secure engagement between the cover plate and the vent. Furthermore, due to abrasion, relative movement between the clamping foot and the clamping slot is likely to occur after being used for a long time. Nevertheless, the retaining groove and the projection can realize the effect of secondary stabilization for engagement, and therefore better restrict circumferential rotation of the cover plate relative to the vent.

In a preferred embodiment, the retaining groove is 0.5 to 2.5 cm deeper than the clamping slot. If the retaining groove is excessively deep, the mounting would be difficult. However, if the retaining groove is insufficiently deep, a relatively poor restriction effect may result.

In a further preferred embodiment, the projection has a thickness smaller than the depth of the retaining groove. If the projection has a thickness equal to the depth of the retaining groove, then in order to achieve good flatness of the mounting surface, a higher flatness is required for the surface where the projection engages with the retaining groove. The requirement for the flatness of the surface where the projection engages with the retaining groove can be reduced if the projection has a thickness smaller than the depth of the retaining groove.

In one embodiment, six clamping feet are provided, with the sum width thereof accounting for ⅓ to ½ of the outer circumference where the clamping feet are mounted. The clamping feet have superior strength and can hardly be broken or damaged. The number of the clamping feet is not limited and can be determined according to the actual diameter of the hole of the vent preferably as in the range from 3 to 8. Too many clamping feet, e.g. more than 10 clamping feet, can raise the processing difficulty and the processing cost. Too few clamping feet, e.g. 2 clamping feet, tend to bring about uneven stress distribution.

In one preferred embodiments, the six clamping feet are equal in size, and the clamping slots engaging with the clamping feet are also equal in size. In this manner, mounting the clamping feet into the clamping slots is convenient, since it is unnecessary to discern size or orientation of these members.

DETAILED DESCRIPTION OF THE EMBODIMENTS

The present disclosure will be further illustrated below in conjunction with the accompanying drawings and specific embodiments.

Figure 1:
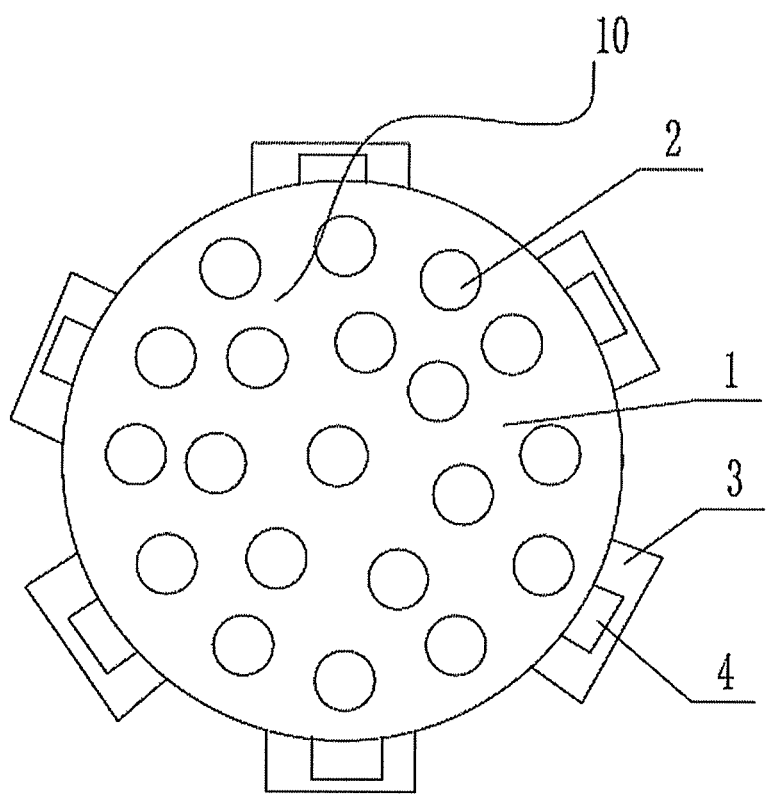
FIG. 1 shows one embodiment of a cover plate of a vent and cover plate assembly for dust-free workshop floor according to the present disclosure.
Figure 2:
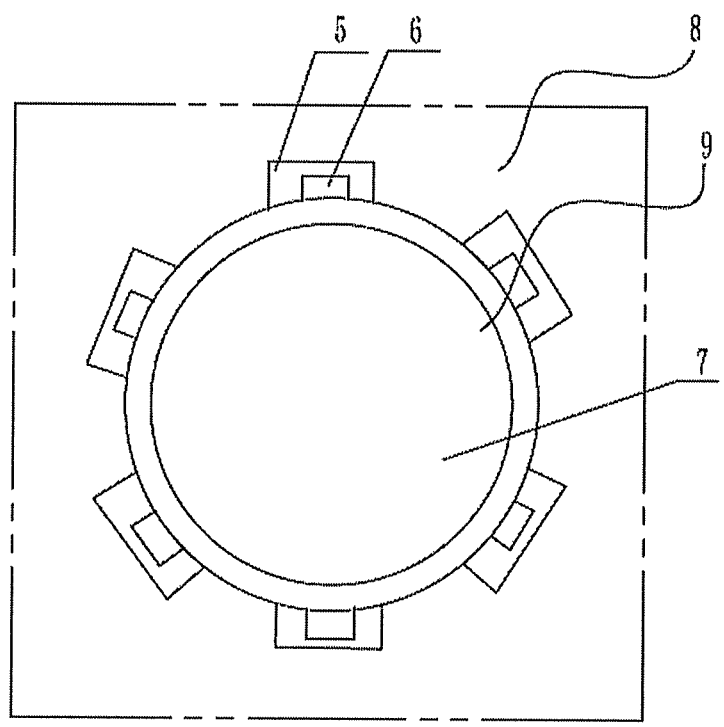
FIG. 2 schematically shows a vent that can be used with the cover plate in FIG. 1.

FIG. 1 and FIG. 2 show one specific embodiment of a vent 9 for dust-free workshop floor and a cover plate 10 that can be used with the vent 9. In this embodiment, a vent and cover plate assembly for dust-free workshop floor according to the present disclosure includes a plurality of vents 9 arranged on a dust-free workshop floor 8 and cover plates 10 that can each engage with a corresponding vent 9. The vents 9 each include a hole 7 and clamping slots 5 arranged at an outer periphery of the hole 7. The cover plates 10 each include a cover body 1 and clamping feet 3 arranged at an outer periphery of the cover body 1. The cover body 10 engages with the hole 7, and each clamping foot 3 engages with a corresponding clamping slot 5.

In general, the cover bodies 1 placed in different areas of a dust-free workshop require different ventilation rates according to different requirements for cleanness and airflow directions in the dust-free workshop. Air holes 2 in different numbers and/or with different diameters are arranged on the cover body 1 according to different requirements for the ventilation rate. Of course, the air holes 2, if not needed, may not be arranged on the cover body 1.

As shown in FIG. 2, preferably in this embodiment, a plurality of said clamping slots 5 can be uniformly distributed along a circumferential direction of the hole 7, in order to achieve a uniform stress distribution.

For easiness of processing, the clamping slots 5 are generally in regular shapes, such as squares, semicircles, arcs, etc. The plurality of clamping slots 5 may be in the same shape. Alternately, some of these clamping slots 5 may be in one single shape, and the other clamping slots 5 may adopt other shapes. In FIG. 2, the clamping slots 5 are preferably all square slots.

In one preferred embodiment, a retaining groove 6 is arranged inside the clamping slot 5, and a projection 4 which can be fit into the groove is arranged on a mounting surface of the clamping foot. During mounting, the engagement of the retaining groove 6 and the projection 5 restricts the circumferential rotation of the cover plate 10. In FIG. 2, the retaining groove 6 is arranged in the middle of the clamping slot 5.

Since the vent has a diameter in the range from 20 to 50 cm in general, in a further preferred embodiment, the retaining groove 6 can be 0.5 to 2.5 cm deeper than the clamping slot 5 in order to clamp the cover plate 10 better. Furthermore, for easy mounting, the projection 4 preferably has a thickness smaller than the depth of the groove 6. The thickness of the projection 4 refers to the height of the projection 4 extending out the clamping foot 3, and the depth of the retaining groove 6 refers to the depth of the retaining groove 6 below the surface of the clamping slot 5. In general, the projection 4 has a thickness 0.1 cm to 0.4 cm smaller than the depth of the retaining groove 6, which can be determined according to actual conditions.

In the present embodiment, six square clamping feet 3 are arranged, with the sum width thereof accounting for ⅓ to ½ of the outer circumference where the clamping feet 3 are mounted.

In a preferred embodiment, the six clamping feet 3 are the same in shape and equal in size, and the clamping slots 5 engaging with the clamping feet 3 are also the same in shape and equal in size.

Although the present disclosure has been described in conjunction with the preferred embodiments, it can be understood that various modifications or substitutes can be made to the present disclosure without departing from the scope of the present disclosure. Particularly, all features in all the embodiments may be combined together as long as structural conflicts do not exist, and the combined features to be formed are still within the scope of the present disclosure. The present disclosure is not limited to the specific embodiments disclosed herein, but encompasses all the technical solutions falling into the scope of the claims.

The invention claimed is:

1. A vent and cover plate assembly for a dust-free workshop floor, comprising a plurality of vents arranged on the dust-free workshop floor and cover plates that are each associated with a corresponding vent,
    wherein the vents each include a hole and clamping slots arranged at an outer periphery of the hole, and the cover plates each include a cover body and clamping feet arranged at an outer periphery of the cover body,
    wherein the cover body engages with the hole, and the clamping feet engage with respective clamping slots,
    wherein a retaining groove is arranged in the middle of the clamping slot and a projection which can fit into the groove is arranged on a mounting surface of the clamping foot, so that the engagement of the retaining groove and the projection during mounting can restrict the circumferential rotation of the cover plate, and
    wherein the projection has a thickness smaller than the depth of the retaining groove.

2. The vent and cover plate assembly for dust-free workshop floor according to claim 1, wherein the clamping slots are uniformly distributed along a circumferential direction of the hole.

3. The vent and cover plate assembly for dust-free workshop floor according to claim 2, wherein the clamping slots can be in the shapes of at least one selected from the group consisting of squares, semicircles, and arcs.

4. The vent and cover plate assembly for dust-free workshop floor according to claim 1, wherein the retaining groove is 0.5 to 2.5 cm deeper than the clamping slot.

5. The vent and cover plate assembly for dust-free workshop floor according to claim 1, wherein six clamping feet are provided, with the sum width thereof accounting for ⅓ to ½ of the outer circumference where the clamping feet are mounted.

6. The vent and cover plate assembly for dust-free workshop floor according to claim 2, wherein six clamping feet are provided, with the sum width thereof accounting for ⅓ to ½ of the outer circumference where the clamping feet are mounted.

7. The vent and cover plate assembly for dust-free workshop floor according to claim 3, wherein six clamping feet are provided, with the sum width thereof accounting for ⅓ to ½ of the outer circumference where the clamping feet are mounted.

8. The vent and cover plate for dust-free workshop floor assembly according to claim 1, wherein six clamping feet are provided, with the sum width thereof accounting for ⅓ to ½ of the outer circumference where the clamping feet are mounted.

9. The vent and cover plate assembly for dust-free workshop floor according to claim 5, wherein the six clamping feet are equal in size, and the clamping slots engaging with the clamping feet are also equal in size.

10. The vent and cover plate assembly for dust-free workshop floor according to claim 6, wherein the six clamping feet are equal in size, and the clamping slots engaging with the clamping feet are also equal in size.

11. The vent and cover plate assembly for dust-free workshop floor according to claim 7, wherein the six clamping feet are equal in size, and the clamping slots engaging with the clamping feet are also equal in size.

12. The vent and cover plate assembly for dust-free workshop floor according to claim 8, wherein the six clamping feet are equal in size, and the clamping slots engaging with the clamping feet are also equal in size.

\* \* \* \* \*